(12) United States Patent
Mandry et al.

(10) Patent No.: US 9,397,608 B2
(45) Date of Patent: Jul. 19, 2016

(54) HIGHLY ADJUSTABLE AND ADAPTABLE EXTERIOR PANEL RACKING SYSTEM

(71) Applicant: Anar Solar LLC., Derry, NH (US)

(72) Inventors: James E. Mandry, North Andover, MA (US); Mark Pelletier, Derry, NH (US); Raymond Matthew Bourque, Bristol, NH (US)

(73) Assignee: Anar Solar, LLC, Derry, NH (US)

( * ) Notice: Subject to any disclaimer, the term of this patent is extended or adjusted under 35 U.S.C. 154(b) by 0 days.

(21) Appl. No.: 14/591,059

(22) Filed: Jan. 7, 2015

(65) Prior Publication Data

US 2015/0229263 A1   Aug. 13, 2015

Related U.S. Application Data

(60) Provisional application No. 61/924,384, filed on Jan. 7, 2014.

(51) Int. Cl.
| | |
|---|---|
| *H02S 20/30* | (2014.01) |
| *H02S 30/10* | (2014.01) |
| *H02S 20/10* | (2014.01) |
| *F24J 2/52* | (2006.01) |

(52) U.S. Cl.
CPC .............. *H02S 20/30* (2014.12); *F24J 2/5233* (2013.01); *F24J 2/5264* (2013.01); *H02S 20/10* (2014.12); *H02S 30/10* (2014.12)

(58) Field of Classification Search
CPC ......... H02S 20/10; H02S 20/30; H02S 30/10; F24J 2/5233; F24J 2/5264
See application file for complete search history.

(56) References Cited

U.S. PATENT DOCUMENTS

| | | | | |
|---|---|---|---|---|
| 4,269,173 A | * | 5/1981 | Krueger | F24J 2/4636 126/569 |
| 4,371,139 A | * | 2/1983 | Clark | F16M 13/00 136/244 |
| 5,125,608 A | | 6/1992 | McMaster et al. | |
| 5,228,924 A | * | 7/1993 | Barker | F24J 2/541 136/246 |
| 8,468,755 B2 | * | 6/2013 | Zuritis | F24J 2/4607 52/153 |
| 8,544,221 B2 | * | 10/2013 | Marley | F24J 2/5232 126/608 |
| 8,550,419 B2 | * | 10/2013 | Hausner | F24J 2/5232 126/696 |
| 8,650,812 B2 | * | 2/2014 | Cusson | F24J 2/465 126/621 |
| 8,661,747 B2 | * | 3/2014 | Eide | F24J 2/5207 126/621 |
| 8,776,454 B2 | * | 7/2014 | Zuritis | F24J 2/523 126/621 |
| 8,939,143 B2 | * | 1/2015 | Zuritis | F24J 2/5232 126/569 |
| 8,991,388 B2 | * | 3/2015 | Brothersen | F24J 2/5233 126/600 |
| 9,117,951 B2 | * | 8/2015 | Park | H02S 20/30 |
| 2008/0121273 A1 | | 5/2008 | Plaisted et al. | |
| 2010/0276558 A1 | | 11/2010 | Faust et al. | |

(Continued)

FOREIGN PATENT DOCUMENTS

EP   1947402   1/2008

OTHER PUBLICATIONS

International Search Report and Written Opinion in PCT Application PCT/US2015/010399, US PCT, Apr. 8, 2015.

*Primary Examiner* — Stanton L Krycinski

(57) ABSTRACT

A racking system for holding solar panels and other similar panels in a fixed position and that can easily adjust to terrains which are not level and adapt to variations in solar panel size without different hardware and without significant manual effort is disclosed. Adjustable channels hold the panels in place and the entire assembly process can be completed without the need for bolts, screws, washers, and nuts.

2 Claims, 3 Drawing Sheets

(56) References Cited

U.S. PATENT DOCUMENTS

| | | | |
|---|---|---|---|
| 2010/0299891 A1 | 12/2010 | Myers | |
| 2011/0163051 A1* | 7/2011 | Horanek | F24J 2/5232 211/26 |
| 2012/0017526 A1 | 1/2012 | Eide | |
| 2012/0073219 A1 | 3/2012 | Zuritis | |
| 2012/0097816 A1* | 4/2012 | Tamm | F24J 2/5254 248/309.1 |
| 2012/0124922 A1* | 5/2012 | Cusson | E04H 1/1205 52/173.3 |
| 2013/0008103 A1* | 1/2013 | Sagayama | F24J 2/5232 52/173.3 |
| 2013/0167907 A1* | 7/2013 | Bitarchas | H02S 20/00 136/251 |
| 2014/0014165 A1* | 1/2014 | Echizenya | F24J 2/5233 136/251 |
| 2014/0182663 A1* | 7/2014 | Kuo | H01L 31/0422 136/251 |

* cited by examiner

HIGHLY ADJUSTABLE AND ADAPTABLE EXTERIOR PANEL RACKING SYSTEM

CROSS-REFERENCE TO RELATED APPLICATIONS

This application claims priority from U.S. Provisional Patent Application No. 61/924,384 titled "A Highly Adjustable And Adaptable Solar Panel Racking System", which was filed on Jan. 7, 2014 and which is incorporated fully herein by reference.

TECHNICAL FIELD

The present invention relates to a racking system for holding exterior mounted panels such as solar panels and other similar panels in a fixed position, and more particularly, relates to a racking system that can easily adjust to terrains which are not level and adapt to variations in panel size without different hardware and without significant effort. Channels hold the panels and the entire assembly process is completed without the need for bolts, screws, washers, and nuts.

BACKGROUND INFORMATION

Racking systems for holding exterior panels such as solar panels are commercially available in numerous forms. Most common commercial systems hold 20 solar panels in arrays of solar panels that are typically 5×4, 4×5, 10×2, or 14×2 foot configurations.

Present systems generally fall into 2 categories for holding each solar panel in place. The first wherein the solar panels sit on top of structures and are attached to the structures using holes in the bottom of the solar panel frame mated to holes in the solar panel racking structure(s). Between 4 to 12 sets of fasteners (such as bolts, nuts, and washers) are used per panel to affix the solar panel to the racking structure. In the second category, solar panel frames along the edge of the solar panel are clamped between the top and bottom edges in a racking structure in 2 to 8 places on the solar panel. 1 or 2 sets of fasteners per clamp tighten both the solar panel and the racking structure adjacent to the solar panel.

The problem with present systems is that they require a tremendous amount of fasteners in the form of bolts, U-bolts, screws, washers, and nuts required to both assemble the racking structure and to hold the solar panels in place. A great deal of time is required in the assembly of each racking system and the affixing of solar panels to the racking system. Getting each system 'square' to accept the solar panels (which are manufactured "square") has been shown to take many man-hours for some systems and installations.

Adjustability in these systems usually is in the form of multiple alignment holes but moving from one set of alignment holes to another on a heavy frame is practically impossible and so is not usually done in the field particularly once the solar panel is affixed to the racking system; and therefore proper squaring and height adjustment for alignment between adjacent racks is almost never done. Small variations in the size of the solar panel itself and mounting hole positions in the solar panel frame can also require significant time to recover from the variations.

Accordingly, what is needed is a racking system for holding solar panels and other similar panels in a fixed position and that can easily adjust to terrains which are not level and adapt to variations in solar panel size without different hardware and without significant effort. Adjustable channels should hold the solar panels in place and the entire assembly process should be completed without the need for traditional fasteners such as bolts, screws, washers, and nuts.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
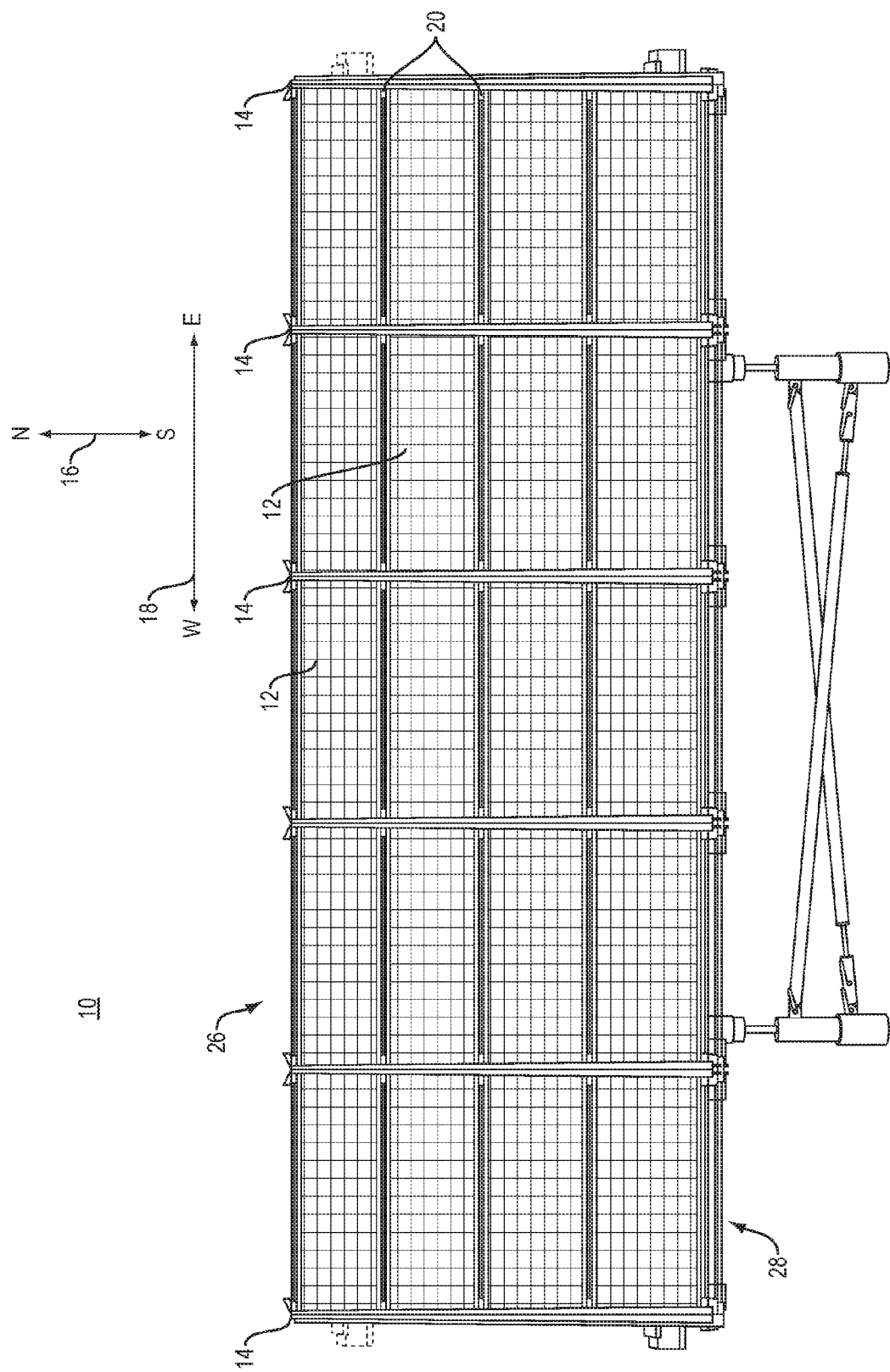
FIG. 1 is a frontal view of an assembled 5×4 panel racking system according to the present invention populated with 20 panels.
Figure 2:
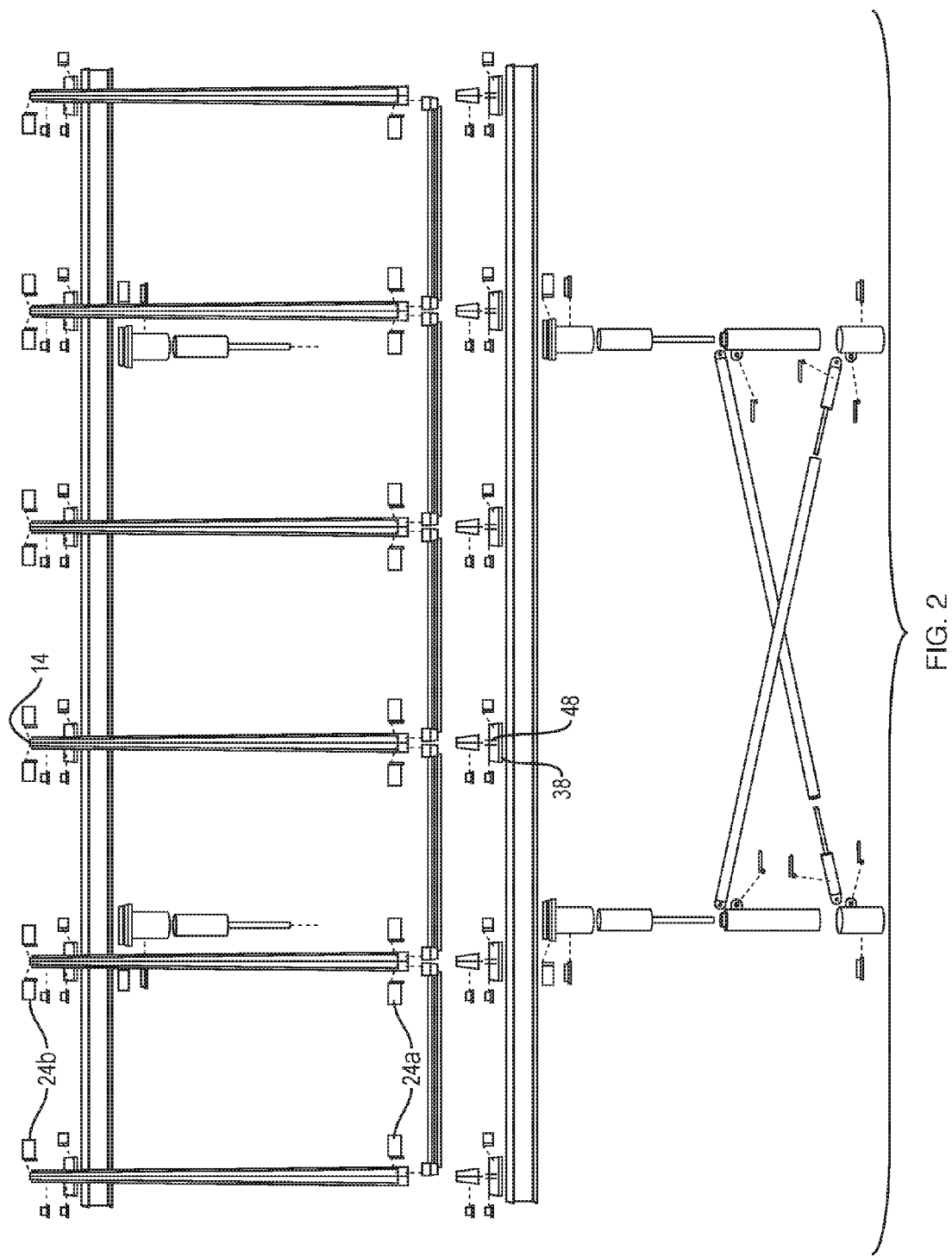
FIG. 2 is an exploded frontal view of a 5×4 panel racking system not populated with panels.

The present invention features an innovative racking system 10, FIG. 1, for holding solar panels 12 and the like in a fixed position. Solar panels 12 are held in place by sliding the solar panels into channels 14 running, in the preferred embodiment, in a 'north-south' 16 orientation and spaced appropriately apart in the 'east-west' direction 18. The channels 14 provide continuous support along 2 sides of the solar panel 12. The channels 14 and channel spacing 18 are sized to accommodate and allow for small variations in solar panel width/length and thickness. Solar panel dimensions between channels can vary as much as ¾" without the need for any changes in racking system setup and so variability by a manufacturer and between manufacturers can be accommodated easily.

In the preferred embodiment, divider members 20 space the solar panels 12 approximately 2" apart in the 'north-south' direction 16, to provide a slot for snow and ice to fall off each panel for better cold weather performance. The 2" separation also produces wind eddy currents around and through the 2" slits that reduces the amount of snow gathering on the solar panels during snow storms where wind is present. The 2" separation also acts as wind ports to significantly reduce the wind load on the whole solar panel array—essentially preventing the solar panel array from acting as one large wind sail. The divider members 20 also provide continuous support along the bottom edge of the solar panel between the north-south oriented channel rails so no intermediate north-south oriented support members are needed—thus keeping complexity and cost down. Without intermediate north-south oriented support members to block the bottom of the panels, maximum heat exchange can be achieved between the bottom of the solar panel and an optional thermal heat exchange system mounted under the solar panel. Mounting of an optional heat exchange system is also greatly simplified.

Eyelets (not shown) are configured to hold electrical wiring and may also be attached to the divider structure 20 to provide a convenient way to buss wiring around safely and neatly in the east-west direction under the solar panel array. Dividers are made to the approximate length of the solar panel edge they support and are, in one preferred embodiment, primarily 1" "angle iron" with a spacer block at each end to maintain the approximate 2" spacing between each solar panel. With the north-south oriented channels 14 providing continuous support of the solar panels 12 on 2 sides, and the divider members 20 providing continuous support on the other 2 sides, all 4 sides of the solar panel are supported. Snow loads in the northern climates are easily accommodated with this structure.

Figure 3:
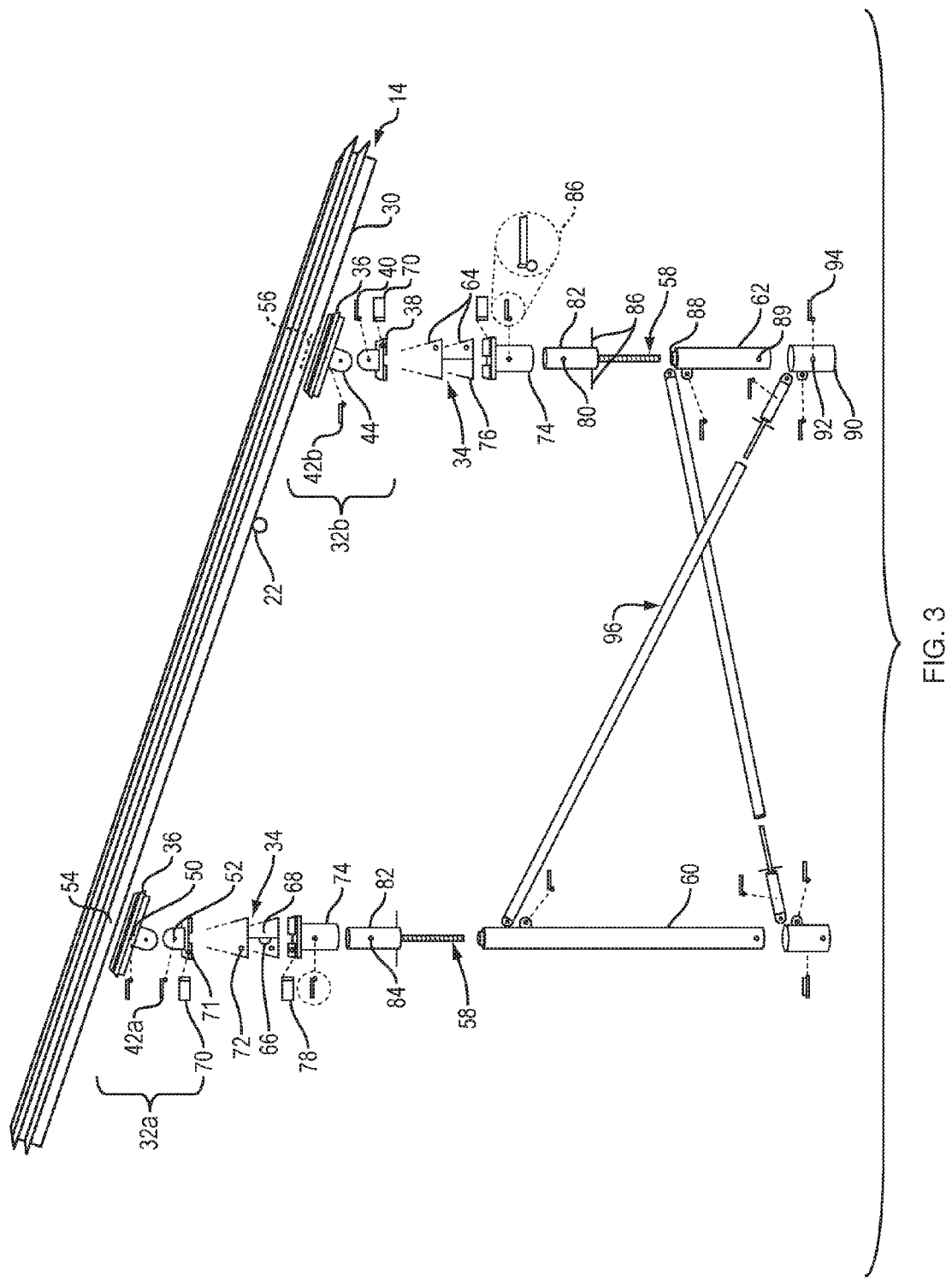
FIG. 3 is an exploded side view of a 5×4 panel racking system according to the present invention.

Flat metal bands (not shown) attached in the north-south oriented channels 14 may be provided and are shaped to extend into the channel slightly to act as "springs" to keep solar panels from rattling when there is space between solar panel edge and the edge of the support channel 14. Eyelets 22 FIG. 3 designed to hold electrical wiring may also be attached to the bottom of the channel 14 to provide a convenient way to buss wiring around safely and neatly in the north-south direction under the solar panel array. Additionally, the eyelets 22 FIG. 3 may also be used to support tubing for an optional liquid-based heat exchanger system mounted under the solar panels or in place of solar panels.

Lock pins 24b and 24a at the top and bottom of the north-south oriented channels 14 respectively hold panels securely in place once the channel 14 has been populated with solar panels 12. Lock pins 24 can be easily converted to secure, locking lock pins in areas where solar panel theft may be an issue. Instead of or in addition to lock pins, a cable can be threaded through holes in the vertical edge of the north-south oriented channels and this cable can have a locking mechanisms at each end and/or be electrified as part of an active security system. If a cable is used, the cable must be secured at each end. No further fastening of the solar panels is required, such as with bolts, washers, and nuts.

Solar panels 12 can be loaded into the north-south oriented channels 14 either from the top 26 ('north' side or highest point) or bottom 28 ('south' side or lowest point) of the north-south oriented channels 14. If the solar panels 12 are being moved to the solar panel racking system on a trailer or some similar means where the panels are off the ground, it may be logistically easier to load the panels from the top 26 ("north" end) since the top 26 is typically about 8 feet off the ground and inclined higher than the "south" end 28, and the panels 12 will naturally slide downward toward the bottom end 28 once inserted into the channels 14. If the solar panels 12 are already on the ground, it may be easier to load the panels from the bottom 28 ("south" end) since the bottom end 28 is typically about 3 feet off the ground. Lock pins 24 to secure one end of the panels 12 in a channel 14 can be inserted into the north-south oriented rails 14 at the farthest point away from the loading point ahead of the racking system assembly.

Panels 12 are loaded by first inserting a 2" divider 20 into and between two adjacent north-south oriented channels 14 followed by a solar panel 12. The divider 20 and a first solar panel 12 are pushed into the channel 14 far enough to accept another 2" divider 20 and then another solar panel 12 is pushed into the channel 14. This process continues until all solar panels 12 for that channel combination 14 with divider members 20 are inserted in the north-south oriented channel pair. The final 2" divider 20 is inserted to complete the process and the final lock pins 24 are inserted to secure the solar panels 12 in that channel 14. For a system with 4 solar panels 12 per north-south oriented channel set between two (2) adjacent channels 14, a complete load time of 2-3 minutes is achievable.

Each north-south oriented channel 14 includes a downwardly projecting flange 30. Compound sliding structures 32 ('sliders') attach the north-south oriented channel beams 14 to the lower east-west oriented H-beams 34. These are compound structures because there is one 'slider' element 38 that slides along the east-west oriented H-beam 34, and another 'slider' element 36 that slides along the projecting flange 30 of the north-south oriented channel beam 14 with a lock pin 40 acting as a hinge pin between the 2 slider elements 36, 38.

Hinge pin 40 allows the north-south oriented channel beams 14 to be easily adjusted to any practical angle required for the optimal solar panel positioning while providing enough structural rigidity. The hinge point at 40 is created by a metal plate or flange 44 attached downwardly and perpendicular to the body of the north-south oriented slider 36 that slips with minimal play into a slot 48 made between 2 parallel metal plates attached perpendicular to the body of the east-west oriented slider 38 with holes drilled in the parallel plates to allow a lock pin 40 to pass through the holes and create the hinge.

One channel beam slider 32a is attached toward the north side of each of the north-south oriented channel beams 14 and one channel beam slider 32b is attached toward the south side of each of the north-south oriented channel beams 14, with lock pins 42 through appropriate mounting holes in the channel beam slider 32 and the channel beam 14.

Each channel beam slider element 38 has a long and narrow vertical slot 48 between two parallel pieces of metal such that the bottom vertical edge 44 of the channel beam slider element 36 fits snugly into this slot. The channel beam slider element 38 has a hole 52 in the center of the slot 48 to accept a lock pin 40 for locking the north-south oriented channel beam 14 at a fixed position. The north-south oriented channel beam 14 has one hole 54 drilled near the north end of the channel beam 14 to mate to the north-most slider element 36, and several (5 for example) holes 56 drilled near the south end of the channel beam 14 in the present implementation to offer multiple mating points between the beam 14 and the slider element 36. The advantage of this 'slider' system is that it enables extremely easy, fast, and customizable assembly of the solar racking system.

In the present implementation, 1" angle iron is used to make the slider slots 48 and the angle iron side not contacting the north-south oriented beam faces 'up' to create a shelf for the channel beam 14 edge to rest on before the beam 14 is aligned to the slot. Once the channel beam 14 vertical edge 30 aligns to the slider slot 48, the channel beam vertical edge 30 drops into the channel slider slot 48. Thus, when assembling the racking system, the north-south oriented beam 14 can be quickly fitted into the slider slots 48 and can slide easily north and south 16 in the slider elements 36.

The north-south oriented channel beam 14 is then aligned to the north slider mounting hole 54 and a lock pin 42a locks the north side of the north-south oriented channel beam in place. The heights and angles of the north-south oriented channels are adjusted with 'adjusters' 58 to get the proper height and angle during which the south side of the north-south oriented channel 14 simply slides into and rests inside the slider slot 48 of the south most slider element 36 during the adjustment process. With the distance between vertical legs 60/62 of the racking system 10 fixed regardless of solar panel angle, a larger north-south oriented angle will require a longer distance between the channel slider lock pin holes 54, 56 and, conversely, a smaller north-south oriented angle will require a shorter distance between the channel slider lock pin holes 54, 56. Once the channel beams 14 are in the desired position and orientation, a lock pin 42b should be inserted into the south channel slider element 36 and the closest of the 5 mounting holes 56 in the channel beam 14 to complete the assembly of the channel beams. If one of the 5 mounting holes in the channel beam is not aligned to the channel slider hole in the slot, the vertical leg adjusters 58 can be used to align the holes 56 for the lock pin 42 to be inserted and locked.

Horizontal H-beams 34, orientated with the 'H' rotated 90 degrees so the sides 64 (H-beam flanges) of the 'H' are at the top and bottom, are used to hold the weight of the north-south oriented channel beams 14 and the panels 12 loaded into the channels 14. Eyelets 66 configured to hold electrical wiring may also be attached to the vertical part 68 of the H-beam 34 to provide a convenient way to buss wiring around safely and neatly in the east-west direction under the solar panel array.

The channel H-beam slider 38, which is the bottom part of the compound slider that attaches the north-south oriented channel beam 14 to the east-west oriented H-beam 34, can be affixed at various intervals along the H-beam 34 using lock pins 70 to hold the north-south oriented channel beams 14 in place. Because these channel H-beam sliders 38 can slide to any position on and along the H-beam 34, the same racking system can accommodate a wide range of solar or other panel sizes and orientations. Using any number of different methods, such as colored markings along the H-beam 34, tic marks scribed into the H-beam metal, different position/offset holes, etc., the channel H-beam sliders 38 can be positioned to the correct location on the H-beam 34 based on the solar panel 12 size and orientation and locked to the correct position using lock pins 70 inserted through appropriate holes 71 drilled in the H-beam channel sliders 38 and the holes 72 drilled at various locations in the H-beam 34.

'Leg' sliders 74 are attached to the bottom flanges 76 of the east-west oriented H-beams 34 to position and support the legs 60/62 of the solar panel racking system. In most implementations, it is anticipated that 4 legs will be used for a typical solar panel array so 2 leg sliders will be on the back (northern) H-beam and 2 leg sliders will be on the front (southern) H-beam. Similar to the channel sliders described above, the leg sliders 74 are affixed at specific points along the length of the H-beam. Because these leg H-beam sliders 74 can slide to any position on the H-beam 34, the same racking system can accommodate a wide range of solar panel sizes and orientations. Using any number of different methods, such as colored markings along the H-beam, tic marks scribed into the H-beam, different position/offset holes, etc., the leg H-beam sliders 74 can be positioned to the correct location on the H-beam 34 based on the solar panel size and orientation and locked to the correct position using lock pins 78 through appropriate holes drilled in the lower or bottom flange 76 of the H-beam 34 and in the leg sliders 74.

In general, the leg sliders 74 are positioned along the H-beam 34 to approximately evenly divide the weight of the supported system so that the overhang weight (that portion of the panel system that overhangs outside the leg sliders) balances the weight between the 2 sliders—thus minimizing drooping and size/strength requirements on the H-beam 34. In the current implementation, the leg sliders have a 6" long 2.5" diameter metal pipe portion attached to the portion of the leg slider 74 sitting against the bottom 76 of the east-west oriented H-beam 34. After the lower leg portion of the solar racking system has been assembled, there should be 4 vertical legs properly spaced/adjusted and ready to accept the east-west oriented H-beams 34. The 4 vertical legs have a 2" diameter pipe 82 at the top which fits snugly into the 2.5" diameter pipes on the leg sliders 74. The east-west oriented H-beams 34 are lifted up and, with the leg sliders 74 in their proper places, the H-beams 34 are placed on top of the appropriate vertical legs 60/62 with the vertical leg pipes 82 fitting into the leg sliders 74. A hole 84 drilled through the leg slider pipe 74 is aligned with a hole 80 drilled through the top of the vertical leg 82 and a lock pin 86 is inserted through the aligned holes to lock the leg 82 into the leg slider 74.

Both the channel H-beam slider 38 and the leg slider 74 slide over the flanges of the east-west oriented H-beam 34—the channel H-beam slider 38 on the top flanges and the leg slider 74 on the bottom flanges. Thus the upper and lower sliders 38, 74 on the H-beam can be positioned completely independent of each other. This independence enables a large degree of logistical flexibility when choosing when and where to assemble the sliders onto the H-beam and what configurations can be created with the same hardware. Due to stacking efficiency, it is likely that the H-beams 34 will be shipped to the assembly location without any sliders 38, 74 attached. To keep the weight of the H-beam 34 down to a minimum for lifting into the vertical legs, only the 2 leg sliders 74 will be attached to the H-beam 34 before placing the H-beam 34 onto the vertical legs 82; the channel H-beam sliders 38 can then be slid onto the H-beam 34 after the H-beams 34 have been locked in place on the vertical legs 82.

The part of the sliders 38/74 that slides over the flange of the H beam 34 can be manufactured from a number of materials such as steel, aluminum, or structural fiberglass. In the current implementation, the slider is manufactured from steel by bending 2 ends of appropriately sized flat-stock back 180 degrees with an offset just a little larger than the thickness of the H-beam flanges and a width just a bit wider than the width of the H-beam flanges. The slider should be snug but yet travel freely along the H-beam and have enough play to accommodate slight variations in the H-beam flange width and thickness. Presently, it is contemplated that the leg slider 74 will be 6" long (in the direction of the H-beam) while the channel H-beam slider 38 about 3" long.

The 'sliders' 38/74 accomplish 2 important goals. First, they enable the manufacturing process to use either 'off the shelf' materials such as 'H' beams or easily manufactured parts to be 'cut-to-length' as needed for a particular solar panel size and configuration. Other than drilling some holes and optionally adding markers, no customization of the H-beams or channel beams are needed. Second, the sliders allow for easy customization/adjustment using the same major components even after the solar rack is partially or fully assembled. For example, the same racking system can spread the channels rails from 64.5" to 66.5" to accept solar panels from different manufacturers by simply using different lock pin holes for the channel H-beam sliders. This capability will yield lower overall material costs and reduced labor costs as well as create a better and more easily adaptable solar panel array solution.

In the present implementation, the east-west oriented H-beam 34 is preferably 27 feet long to accommodate 5 channels of solar panels with 4 solar panels per channel (20 solar panels total) with the long solar panel dimension in the east-west oriented direction. The north-south oriented channel beams are preferably 14 feet 2 inches long.

Each leg of the solar panel rack has a height adjustment range of about 10" in this implementation. In the case where the solar racking system is installed on level ground, the total length of the legs in front (south) and the legs in back (north) will place the north-south oriented channel beams at an 18 degree angle from horizontal, which is considered an ideal fixed angle for solar installations in the mid to northern United States. By using the height adjuster screw 58 in each leg, it is possible to change the angle by +/−5 degrees if a different angle is deemed better where the solar array is being positioned. These same height adjusters in each leg can be used to compensate for a terrain that isn't level so that all solar panel arrays can be perfectly aligned in a row despite changes in terrain, giving a visually pleasing result. The longer part of the leg assembly can be swapped out for longer or shorter pieces if the terrain slopes by more than the adjustability within the default legs. Because the height adjuster mechanism 58 in each leg uses a threaded rod to accomplish the height adjustment, the entire fully-loaded and fully assembled solar panel array can be easily adjusted to the final height and angle by simply turning the handles on the height adjustment mechanism. Additionally, the use of a threaded rod means very fine/precise adjustments are possible.

In this implementation, handles 86 are permanently attached to the height adjustment mechanism but a variation of the height adjuster would have a nut attached to the threaded rod and a wrench could be used to turn the height adjustment mechanism.

After final adjustments are made, a lock pin 86 is inserted at the top of the leg through a hole 80/84 in the leg and an aligned hole on the leg slider 74. In contrast, other available racking systems today have either no ability to adjust height (height fixed by attachment points done in advance of the solar rack assembly—such as cement footings, auger screws, or rooftop brackets), or are typically multiple aligned bolt holes that require supporting the weight of whatever has been assembled in order to change bolt holes (and is seldom done because of the weight issue).

The legs 60/62 in the present system are preferably made with 2" diameter steel schedule 40 pipe. A 6" long piece of 2.5" diameter schedule 40 pipe is part of the leg slider (discussed above) and the top of the leg fits snugly into that 2.5" diameter receiver pipe 74. The top of the leg 82 is an 8" long piece of 2" diameter pipe that has a 1" threaded rod 58 12" long welded into the bottom-center of the 8" long piece of pipe. When the 8" long piece is in the 6" leg slider piece, the 8" long piece can rotate freely inside the 6" piece and acts as a bushing for the height adjuster mechanism. 2 4" long ⅜" thick rods 86 are welded on opposite sides of the bottom edge of the 8" long piece and act as handles so the 8" piece can be rotated easily.

The bottom of the leg is another 2" diameter piece of steel schedule 40 pipe that has a 1" nut 88 welded into the top-center of the pipe to accept the 1" threaded rod welded into the 8" long piece of the leg assembly. In most scenarios, the 1" rod will be threaded about half-way into the bottom leg so minor variations in the terrain or attachment points can be easily compensated by threading the 1" rod either in or out. The bottom leg is cut to the appropriate length that, when combined with the 8" long piece of the leg, meets the requirements for the total length of the leg with the adjusting rod threaded half way into the bottom piece of the leg. A hole 88 is made 3" from the bottom of the bottom leg to lock the leg into a 6" long 2.5" diameter receiver pipe 90 that is mounted to whatever the racking system will be permanently attached such as a ground engaging foot or ballast member (not shown but well known in the art). Once the hole in the leg 88 is aligned with a corresponding hole 92 in the leg bottom receiver pipe 90, a lock pin 94 is installed so the bottom leg cannot rotate in nor be pulled out of the bottom receiver pipe.

Leg support pipe assemblies 96 are used to firmly support the 4 legs in the vertical position before the east-west H-beams are placed on top of the legs. These leg support pipe assemblies have a flange on one end that slips between 2 parallel flanges welded to the side of the bottom vertical leg at a fixed distance from the bottom of the leg so the same support pipe assemblies can be used even if the bottom leg length needs to be changed; a lock pin through holes in all three flanges locks that end of the support pipe assembly in place. The other end of that length of support pipe has a ¾" nut centered at the end of the pipe and welded to the end. Just like the legs have height adjusters, each support pipe assembly has an adjuster to adjust the total length of the support pipe assembly. The other end of the support pipe assembly is the length adjuster assembly that is comprised of a 6" long ¾" diameter pipe with a ¾" threaded rod welded into one end that is enclosed by a 6" long 1" diameter pipe. ¾" washers are welded onto the ends of the 1" diameter pipe so that the ¾" diameter pipe is held in-place in the 1" diameter pipe. The 1" diameter pipe and the 2 washers act like bushings/bearings; the ¾" diameter pipe and the threaded rod can rotate freely inside the 1" diameter pipe but cannot travel in the direction of the threaded rod.

A flange is welded onto the washer opposite the side where the threaded rod comes out of the length adjuster assembly, and this flange will go between 2 flanges welded onto the bottom receiver pipe of an adjacent leg or to flanges somewhere on the base attachment system. After the support pipe assembly length has been properly set, a lock pin through holes in all three flanges locks that end of the support pipe assembly in place. The ¾" threaded rod is threaded about half-way into the leg support pipe with the ¾" nut welded to the end of the pipe and the total length of the support pipe assembly is set by the distance between sets of flanges with the vertical legs perfectly positioned. 2 3" long ¾" rods are welded on opposite sides of the ¾" threaded rod close to the ¾" washer and these rods act as handles so the length adjusters can be rotated easily. As an alternative to the 3" long rods permanently welded to the adjuster mechanism for adjustment, a nut welded in-place close to where the ¾" rod is welded into the ¾" diameter pipe can be used in conjunction with a removable wrench for height adjustment. 2 holes drilled through the inner ¾" diameter pipe aligned to 1 hole drilled through the outer 1" diameter pipe of the length adjuster assembly enables the length adjuster to use a lock pin to fix the length adjuster to 1 of 4 positions once the desired support pipe assembly length has been achieved.

Using the leg support assembly pipes with the threaded rod length adjusters, getting the 4 vertical legs of the solar panel array adjusted is easy by simply 'dialing in' or "tuning" the length of support assembly pipes to get the 4 vertical legs perfectly (or near perfectly) level (vertical) and at the right relative separations. This leveling and squaring process can all be done before the east-west oriented H-beams and north-south oriented channel beams are lifted into place. Once the legs are set up properly, the east-west oriented H-beams can then be lifted onto the vertical legs and pinned in-place with the lock pins. The north-south oriented channel beams can also be put in place as discussed earlier. If one of the 5 southern channel holes for the channel slider lock pins do not line up, one or more of the support pipe assemblies can be adjusted to zero in (adjust) the lock pin holes and the final lock pins inserted into the channels sliders.

With the entire rack assembled, it is recommended that leg support length adjusters be adjusted slightly to take any slack out of the system and then the final lock pins can be inserted into the leg support length adjusters.

The racking system is fully assembled without the use of any bolts, nuts, washers, screws, etc. It has been shown that this racking system, for a 20 solar panel array for example, can be fully assembled, including loading solar panels, by 2 individuals in approximately one hour compared to existing systems that typically take 2 individuals 4-6 hours for assembly.

Modifications and substitutions by one of ordinary skill in the art are considered to be within the scope of the present invention, which is not to be limited except by the allowed claims and their legal equivalents.

The invention claimed is:

1. An adjustable racking system for a plurality of panels, said adjustable racking system comprising:
   a plurality of support legs (60/62), each of said plurality of support legs including a bottom region (90), configured for engaging with a ground contacting or ballast structure, and a top region (88) configured for receiving a height adjustable top member (82), each said height adjustable top member (82) configured for receiving an east-west oriented structure support member (74), each said east-west oriented structure support member (74) configured for slidably receiving an east-west oriented support structure (34);

a plurality of north-south oriented support structures (14), each of said plurality of north-south oriented support structures (14) configured for slidably receiving one edge of one or more of said plurality of panels (12), and for slidably receiving one end of one or more divider members (20), and for slidably interconnecting with one or more north-south oriented structure interconnecting members (36);

a plurality of said east-west oriented support structures (34), each of said plurality of east-west oriented support structures configured for slidably interconnecting with one or more of said east-west oriented structure support member (74) mounted on a respective one of said support legs (60/62);

a plurality of north-south oriented structure support members (38), each of said plurality of north-south oriented structure support members (38) configured for slidably interconnecting with one of said plurality of east-west oriented support structures (34);

a plurality of said north-south oriented structure interconnecting members (36), each of said plurality of north-south oriented structure interconnecting members (36) configured for pivotably interconnecting with one of said north-south oriented structure support members (38) and for slidably interconnecting with a one of said north-south oriented support structures (14), and for supporting a north-south oriented support structure (14); and a plurality of said divider members (20), each of said plurality of divider members (20) configured for being disposed between first and second adjacent north-south oriented support structures (14) of said plurality of north-south oriented support structures, for creating a support frame for supporting said plurality of panels (12).

2. The adjustable racking system of claim 1, wherein said east-west oriented support structures (34) are configured as an "H" beam having a top generally planer member and a bottom generally planer member coupled by an interconnecting member disposed perpendicular to said top and bottom generally planer members, and wherein said east-west oriented structure support members (74) are configured for slidably interconnecting with said bottom generally planer member of said "H" shaped east-west oriented support structure (34), and wherein said plurality of north-south oriented structure support members (38) are configured for slidably interconnecting with said top generally planer member of said "H" shaped east-west oriented support structure (34).

* * * * *